Figure 1:
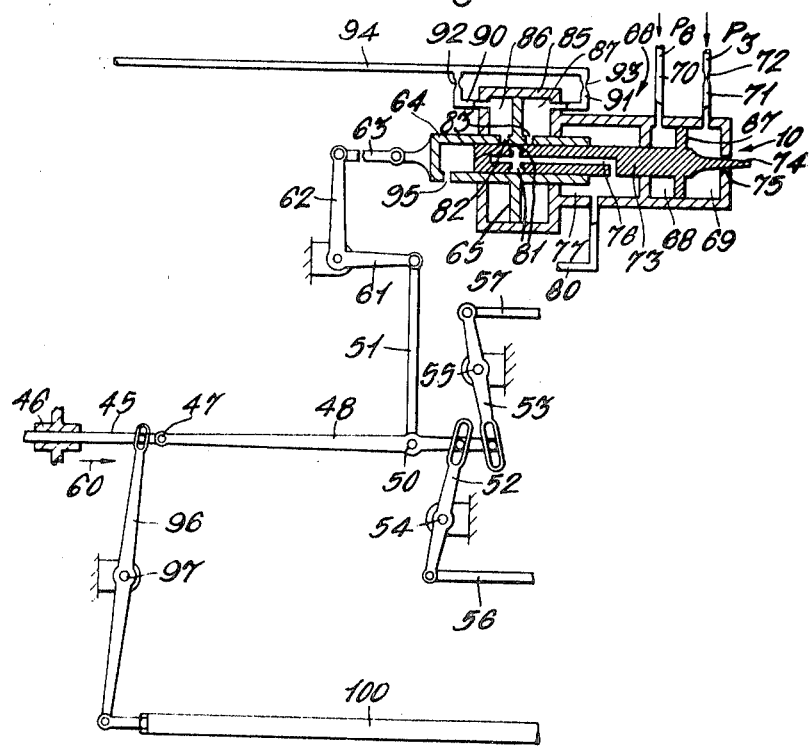

United States Patent
Johnson et al.

[15] 3,648,460
[45] Mar. 14, 1972

[54] GAS TURBINE ENGINE FUEL CONTROL SYSTEM

[72] Inventors: Christopher Linley Johnson, Hartshorne, near Burton-on-Trent; John Robert William Whitmarsh, Derbyshire, both of England

[73] Assignee: Rolls-Royce Limited, Derby, England

[22] Filed: Nov. 13, 1970

[21] Appl. No.: 89,288

[30]   Foreign Application Priority Data

Nov. 19, 1969   Great Britain......................56,677/69

[52] U.S. Cl..............................60/243, 60/39.28, 60/261, 60/262
[51] Int. Cl..........................................................F02k 3/10
[58] Field of Search .........................60/39.28, 243, 262, 261

[56]   References Cited

UNITED STATES PATENTS

| | | | |
|---|---|---|---|
| 3,243,955 | 4/1966 | Frank | 60/39.28 R |
| 3,319,418 | 5/1967 | Bryant | 60/39.28 R |
| 3,541,789 | 11/1970 | Gascoigne | 60/39.28 R |

*Primary Examiner*—Clarence R. Gordon
*Attorney*—Cushman, Darby & Cushman

[57] ABSTRACT

The invention concerns a gas turbine engine fuel control system comprising a first burner supply conduit and at least one second burner supply conduit, a fuel pump which communicates with both said conduits so as to be adapted to supply fuel thereto, first and second restrictors respectively provided in the first and second burner supply conduits, a flow control valve which is connected in the first burner supply conduit downstream of the first restrictor, the flow control valve controlling fuel flow therethrough in dependence upon the value of at least one engine variable, and valve means in the second burner supply conduit downstream of the second restrictor therein, the valve means being controlled in dependence upon the difference in the pressure in the first burner supply conduit downstream of the first restrictor and upstream of the flow control valve, and the pressure downstream of the second restrictor.

14 Claims, 4 Drawing Figures

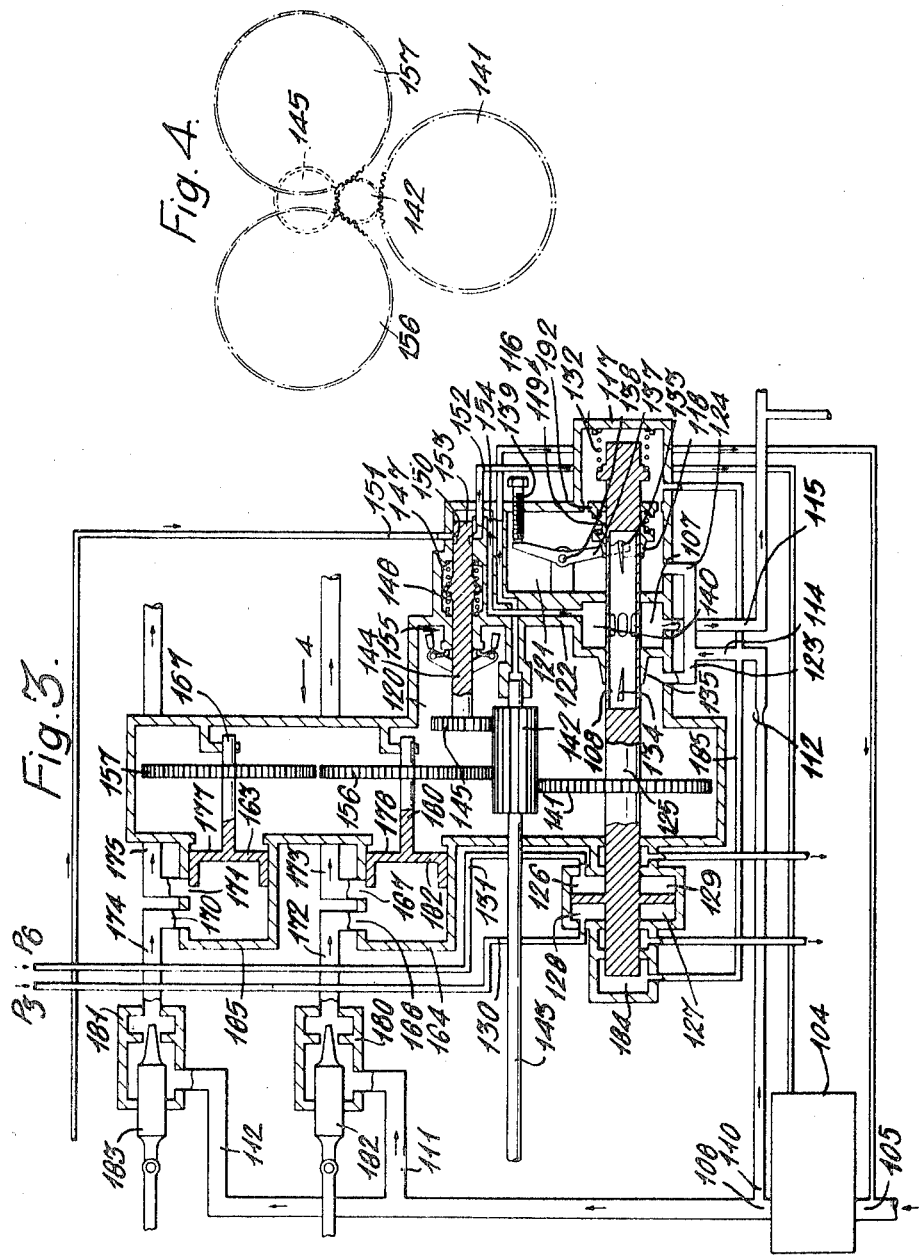

GAS TURBINE ENGINE FUEL CONTROL SYSTEM

This invention concerns a gas turbine engine fuel control system and although the invention is comprising a fuel pump which communicates with a first burner supply conduit it is more particularly one second burner supply conduit so as to be adapted to supply fuel to reheat fuel control system.

According to the present invention, there is provided a gas turbine engine fuel control system comprising a fuel pump which communicates with a first burner supply conduit and with at least turbine engine fuel 74 both said conduits, the first and second burner supply conduits respectively having first and second restrictors therein, a flow control valve which is connected in the first burner supply conduit downstream of the first restrictor the flow control valve controlling fuel flow therethrough in independence upon the value of at least one engine variable, and valve means in the or each second burner supply conduit downstream of the second restrictor therein, the valve means being controlled in dependence upon the difference in the pressure in the first burner supply conduit downstream of the first restrictor and upstream of the flow control valve, and the pressure downstream of the second restrictor.

Manually controllable flow area varying means are preferably provided for varying the relative flow areas of the first and second restrictors. The degree to which the flow area varying means varies the flow area of the or each second restrictor may depend upon the value of at least one engine variable, e.g., upon the ratio of two engine pressures.

The or each second restrictor may comprise a needle valve, the flow area varying means comprising a linkage for adjusting the or each needle valve. Thus the linkage may comprise a manually movable lever movement of which adjusts the or each needle valve, the manually movable lever having a movable fulcrum whose position affects the extent to which manual adjustment of the manually movable lever adjusts the or each needle valve, the manually movable lever being connected to servo means responsive to the value of at least one engine variable so that the position of the said movable fulcrum depends upon the said value.

The first burner supply conduit may communicate, on the downstream side of the flow control valve, with a bleed valve, means being provided for varying the flow through the bleed valve. Thus the last-mentioned means may increase the flow through the bleed valve with increasing movement of the manually movable lever.

Means may be provided for positioning the flow control valve in functional dependence upon the ratio of a compressor pressure and jet pipe pressure.

Means may also be provided for controlling the fuel pump in dependence upon both engine rotational speed and the pressure drop across the flow control valve.

Both the valve means and the flow control valve may be axially movable, common means being provided for rotating both the valve means and the flow control valve to assist axial movement thereof.

The valve means and the flow control means may be mounted in a space in a common housing, which space communicates with the first burner supply conduit to receive fuel therefrom.

In the preferred form of the invention, the first burner supply conduit is arranged to supply fuel to pilot burners of a reheat system in the jet pipe of the engine, a said second burner supply conduit being arranged to supply fuel to main burners thereof.

Thus the fuel flow to the pilot burners may be metered by the flow control valve of a small fuel flow control unit, this metering being employed to control the substantially larger fuel flow for the main burners, by suitable selection of the relative flow areas of the first and second restrictors.

There may moreover be a further said second burners supply conduit which is arranged to supply fuel to burners disposed in a bypass air stream.

Additionally, the invention comprises a gas turbine engine provided with a fuel control system as set forth above.

Figure 2:
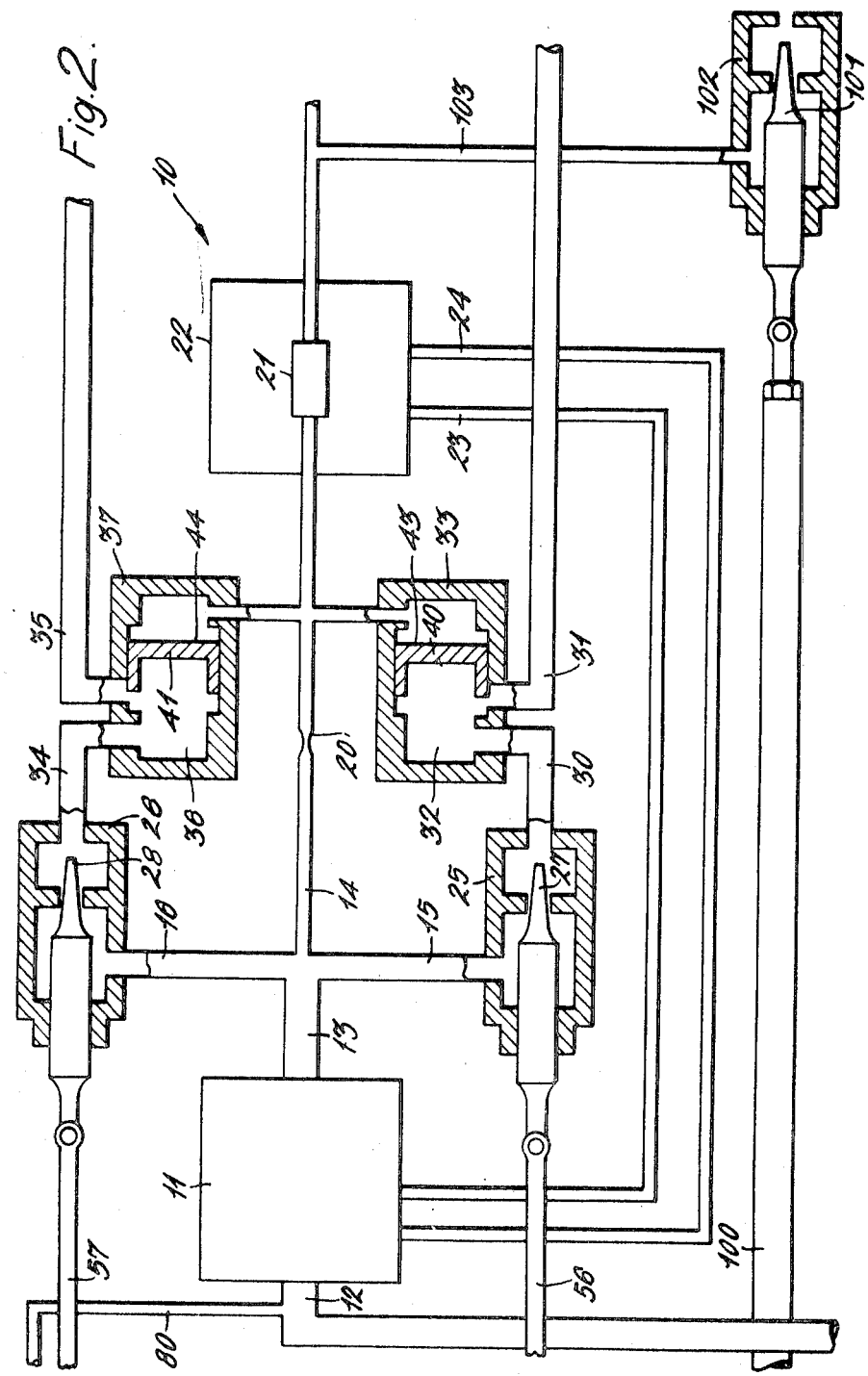

The invention is illustrated, merely by way of example, in the accompanying drawings, in which:

FIGS. 1 and 2 are diagrammatic views of adjacent parts of one embodiment of a gas turbine engine fuel control system in accordance with the present invention, FIG. 3 is a diagrammatic view showing part of another embodiment of a gas turbine engine fuel control system according to the present invention, and FIG. 4 is a diagrammatic view looking in the direction of the arrow 4 of FIG. 3.

The terms "left," "right," "raised," and "lowered," as used in this specification, are to be understood to refer to directions as seen in the accompanying drawings.

In FIGS. 1 and 2 there is shown a gas turbine engine fuel control system for use in a gas turbine bypass engine (not shown) having main combustion equipment, reheat combustion equipment provided in the engine jet pipe, and bypass burners provided in a bypass stream or streams of the engine which are not mixed with the jet gases.

The fuel control system 10 of FIGS. 1 and 2 comprises a reheat fuel pump 11 (FIG. 2) having an inlet conduit 12 which receives low-pressure fuel from an engine-driven backing pump (not shown). The fuel pump 11 has an outlet conduit 13 which communicates with burner supply conduits 14, 15 and 16. The burner supply conduit 14 is arranged to supply fuel to pilot reheat burners (not shown) of the reheat combustion equipment, while the burner supply conduit 15 is arranged to supply fuel to main reheat burners (not shown) of the said reheat combustion equipment. The burner supply conduit 16 is arranged to supply fuel to the bypass burners (not shown).

The burner supply conduit 14 has a fixed restrictor 20 connected therein. A flow control valve 21, which forms part of a flow control unit 22 which controls the fuel flow in dependence upon the value of at least one engine variable, e.g., engine rotational speed, is connected in the burner supply conduit 14 downstream of the restrictor 20. The flow control unit 22 controls the operation of the fuel pump 11 by way of servo lines 23, 24 the pressures in which are dependent upon the difference between the fuel flow through the burner supply conduit 14 at any moment and the fuel flow corresponding to the values of the said engine variable or variables. Thus the fuel flows through the burner supply conduit 14 are controlled by a servosystem which compares actual and desired fuel flows.

The burner supply conduits 15, 16 are respectively provided with variable restrictors 25, 26 the flow areas of which are respectively variable by axially movable needle valves 27, 28. Axial movement of the needle valves 27, 28, by means of a linkage described below, will therefore effect variation of the relative flow areas of the fixed restrictor 20 and the variable restrictors 25, 26.

The burner supply conduit 15, on the downstream side of its restrictor 25, has portions 30, 31 which intercommunicate by way of a space 32 within a valve body 33. Similarly, the burner supply conduit 16, downstream of its restrictor 26, has portions 34, 35 which intercommunicate by way of a space 36 within a valve body 37. Mounted within the valve bodies 33, 37 are axially slidable valve members 40, 41 respectively.

The valve members 40, 41 are respectively provided on their right-hand sides with pressure surfaces 43, 44 which are open to the pressure in the burner supply conduit 14 downstream of the restrictor 20 and upstream of the flow control valve 21. As will be seen from FIG. 2, the valve members 40, 41 are positioned in dependence upon the value of said pressure so that the flows through the conduit portions 31, 35 also depend upon the value of the said pressure.

Thus by appropriately designing the flow areas of the restrictors 20, 25, 26, the metering of the pilot fuel flow through the burner supply conduit 14 by means of the flow control valve 21 also effects metering of the substantially larger fuel flows through the burner supply conduits 15, 16 through which the fuel passes respectively to the main burners and to the bypass burners.

The linkage referred to above for adjusting the needle valves 27, 28 is shown in FIG. 1 and comprises a manually operable member 45 which is axially slidable in a support 46 and which is movable by the pilot's control lever (not shown), the manually operable member 45 being pivotally connected to one end 47 of a movable lever 48 which is thus manually movable by the pilot's control lever. The lever 48 which has a movable fulcrum 50, is connected at its fulcrum 50 to a link 51. The lever 48 has a sliding connection to levers 52, 53 which are respectively pivoted on fixed pivots 54, 55. Links 56, 57, which are respectively pivotally connected to the needle valves 27, 28 are pivotally connected to the levers 52, 53. Thus when lever 48 is axially aligned with the member 45 as shown in FIG. 1, the velocity ratios of the levers 52, 53 are equal and the links 56, 57 are moved equally on movement of the manually operable member 45. Accordingly, when the latter is, at such time, moved in the direction of arrow 60, valves 27, 28 are caused to move towards the left so as to permit more fuel to flow through the restrictors 25, 26, whereby to increase reheat and bypass burning, i.e., to supply more fuel to the main burners and to the bypass burners. If, however, the link 51 is raised or lowered (by means described below), the position of the movable fulcrum 50 is altered so as to affect the extent to which manual adjustment of the movable lever 48 adjusts the needle valves 27, 28. For example, if the link 51 is raised, movement of the link 56 is reduced and movement of the link 57 is increased for a given movement of the member 45.

The end of the link 51 remote from the movable fulcrum 50 is pivotally connected to one arm 61 of a bellcrank lever whose other arm 62 is pivotally connected to one end of a link 63. The other end of the link 63 is connected to a sleeve 64 carrying a slave piston 65 of a servo device 66.

The servo device 66 has a master piston 67 which separates chambers 68, 69, therein. The chamber 68 is open to jet pipe pressure $P_6$ by way of pipe 70, while the chamber 69 is open to a function of compressor delivery pressure $P_3$ by way of pipe 71 having a restrictor 72 therein. The master piston 67 will therefore be positioned in accordance with the pressure ratio $P_3/P_6$.

The master piston 67 is carried by an axially movable member 73 whose right-hand end is provided with a needle valve 74 which controls the flow area of a vent orifice 75 communicating with the chamber 69.

The member 73, which is axially slidable within the sleeve 64, has an axially extending passage 76 therein which is permanently in communication with a chamber 77. The chamber 77 communicates, by way of a passage 80, with the inlet conduit 12 of the fuel pump 11.

The passage 76 communicates with radial drillings 81 which, on relative movement between the members 64, 73, may be brought into communication either with apertures 82 in the sleeve 64 or with apertures 83 therein, the apertures 82, 83 being disposed on opposite sides of the slave piston 65. The slave piston 65 is axially slidable within a body 85 and separates the latter into chambers 86, 87. The chambers 86, 87 respectively communicate with passages 90, 91 having restrictors 92, 93 therein respectively, the passages 90, 91 communicating with a common passage 94 which is supplied (by means not shown) with engine high-pressure fuel.

The sleeve 64 has a vent aperture 95 adjacent to its left-hand end to enable the member 73 to be moved freely therein.

As will be appreciated, if the ratio $P_3/P_6$ should decrease, the master piston 67 will move towards the right and will thus cause rightward movement of the member 73. This will bring the drillings 81 into communication with the drilling 83 so that fuel in the chamber 87 will pass through the drillings 83, 81, passage 76, chamber 77, and passage 80 to the fuel pump 11. The pressure in the chamber 87 will therefore fall, the slave piston 65 will therefore move towards the right, with the result that the sleeve 64 will move towards the right to an extent equal to the rightward movement of the master piston 67 until the drillings 81 are completely occluded by the slave piston 65. Similarly if the ratio $P_3/P_6$ should increase, this will cause leftward movement of the master piston 67 and so will produce equal leftward movement of the slave piston 65.

Accordingly if the ratio $P_3/P_6$ should change, the position of the sleeve 64 will change in dependence thereon, and this will involve a change in the position of the movable fulcrum 50.

For example, if the ratio $P_3/P_6$ increases, the movable fulcrum 50 will be raised so as to vary the velocity ratios of the levers 52, 53 in such a way that, for a given movement of the member 45, the flows through the restrictors 25, 26 are respectively reduced and increased. Thus the servo device 66 acts as a $P_3/P_6$ trimmer which acts on the restrictors 25, 26 in opposite senses, and trims their flows by, say 10 percent.

The manually movable member 45 has a sliding connection with one end of a lever 96 mounted on a fixed pivot 97. The opposite end of the lever 96 is pivotally connected to a link 100 which is itself pivotally connected to a needle valve 101. The needle valve 101 is movable thereby to control the flow area of a bleed valve 102. The bleed valve 102 controls flow through a bleed passage 103 which communicates with the burner supply conduit 14 on the downstream side of the flow control valve 21. As will be seen from FIG. 2, the needle valve 101 will be moved in a direction to increase flow through the bleed valve 102 with increasing rightwards movement of the member 45.

In FIGS. 3 and 4 there is illustrated another embodiment of a gas turbine engine fuel control system according to the present invention, the embodiment of FIGS. 3 and 4 being provided with the linkage shown in FIG. 1.

In the embodiment of FIGS. 3 and 4, the fuel control system comprises a reheat fuel pump 104 having an inlet conduit 105 which is supplied with low-pressure fuel by way of an engine-driven backing pump (not shown). The reheat fuel pump 104 has an outlet conduit 106 which communicates with burner supply conduits 110, 111 and 112 which lead respectively to pilot reheat burners, main reheat burners, and bypass burners of the engine.

The burner supply conduit 110 has a fixed restrictor 112 therein, the conduit 110 having portions 114, 115 which intercommunicate by way of a flow control unit 116 having a housing 117. The housing 117 has spaces 120, 121 therein which are separated by an internal wall 122. The conduit portion 114 communicates with the spaces 120, 121 by way of branches 123, 124.

Rotatably mounted within the space 120 is a flow control valve 125 which is provided, near its left-hand end, with a piston 126 which is axially movable within a cylinder 127. The piston 126 divides the cylinder 127 into separate chambers 128, 129 which respectively communicate with passages 130, 131 which are respectively supplied (by means not shown) with a pressure functionally related to the compressor delivery pressure $P_3$ and with the jet pipe pressure $P_6$. The axially movable flow control valve 125 is thus positioned in functional dependence upon the pressure difference $P_3-P_6$. The flow control valve 125, which is thus urged towards the right by the pressure difference $P_3-P_6$, is urged towards the left by a spring 132.

The flow control valve 125 is provided with axially spaced sets of angularly spaced apart triangular apertures 133, 134 which, on axial movement of the flow control valve 125, are respectively covered to a greater or lesser extent by a sleeve 118 and by a part 135 of the internal wall 122, the sleeve 118 being urged towards the left by a spring 119. The spring 119 acts between an internal wall 136 of the housing 117 and the sleeve 118, the latter being axially slidable over the flow control valve 125. The sleeve 118 is urged into contact with one end of a lever 137 which is mounted on a fixed pivot 138. The other end of the lever 137 is engaged by a setscrew bolt 139 threaded through the housing 117. Thus adjustment of the setscrew bolt 139 adjusts the area of the apertures 133 in order to obtain a desired relation between the pressure difference $P_3$ to $P_6$ and the fuel flow to the pilot reheat burners.

The flow control valve 125 is also provided with a plurality of angularly spaced-apart apertures 107 which, like the apertures 133, 134, communicate with the interior 108 of the flow control valve 125. The apertures 107, however, additionally communicate with a chamber 140 within the internal wall 122, the chamber 140 communicating with the conduit portion 115. Thus as the flow control valve 125 is moved axially in dependence upon the value of the pressure difference $P_3-P_6$, the quantity of fuel which will pass from the conduit portion 114 and through the apertures 133, 134 into the interior 108 will be appropriately adjusted. The fuel will then flow through the apertures 107 to the chamber 140 and so to the conduit portion 115 and the pilot burners, the apertures 107 being sufficiently large to ensure that the movement of the flow control valve 125 will not affect flow therethrough.

The flow control valve 125 is provided with a gear wheel 141 which is axially movable with respect to, but is at all times in mesh with a gear 142 which is mounted on an engine-driven shaft 143. An axially movable and rotatable shaft 144 is provided at its left-hand end with a gear 145 which is in mesh with the gear 142 and is driven thereby. The shaft 144 is urged towards a central position by centralising springs 146, 147. The right-hand end of the shaft 144 acts as a piston valve and is provided with a circumferential channel 150 which, in the centralised position shown, has partial communication with pipes 151, 152. The pipe 151 is supplied, by means not shown, with engine high-pressure fuel, while the pipe 152 communicates with the fuel pump 104 so that the latter is controlled in dependence upon the pressure in the pipe 152. As will be appreciated, this pressure depends upon the axial position of the shaft 144.

The shaft 144 has a pressure surface 153 at its right-hand end which is open via a passage 154 to the pressure within the chamber 140 and therefore to the pressure on the downstream side of the flow control valve 125. The shaft 144 is, however, urged towards the right by the pressure difference across the flow control valve 125, since the left-hand end of the shaft 144 is exposed to the pressure on the upstream side of the flow control valve 125. The shaft 144 is provided with a centrifugal governor 155 which will urge the shaft 144 towards the left with shaft 144. Thus when when the pressure drop across the flow control valve 125 increases, the output pressure of the fuel pump 104 is decreased as a result of the consequential movement of the shaft 144. Moreover, the centrifugal governor 155 will urge the shaft 144 to the left with increasing speed, thus decreasing the pressure in the pipe 152 and so increasing the output of the pump 104. Thus the fuel pump 104 is controlled to maintain the pressure drop across the flow control valve 125 in dependence upon engine rotational speed.

The gear 142 also meshes with gears 156, 157, although in order to simplify FIG. 3 the gear 157 is not shown as being in mesh with the gear 142.

The gears 156, 157 are respectively mounted on shafts 160, 161 which respectively carry piston valve members 162, 163. The piston valve members 162, 163 are respectively mounted in cylinders 164, 165. The cylinder 164 has apertures 166, 167 therein, the flow area of the apertures 167 being controlled by the piston valve 162, while the cylinder 165 has apertures 170, 171 therein, the flow area of the aperture 171 being controlled by the position of the piston valve 163.

The apertures 166, 167 respectively communicate with portions 172, 173 of the burner supply conduit 111 which leads to the main burners. Similarly, the apertures 170, 171 communicate with portions 174, 175 of the burner supply conduit 112 which leads to the bypass burners.

The right-hand surfaces 176, 177 of the piston valves 162, 163 respectively are open to the pressure in the space 120 and thus to the pressure on the upstream side of the flow control valve 125.

The conduit portions 172, 174 are respectively disposed on the downstream sides of variable restrictors 180, 181 the flow areas through which are adjustable by axially movable needle valves 182, 183 respectively. The needle valves 182, 183 correspond to the needle valves 27, 28 of the FIG. 2 construction and, as indicated above, are moved by structure corresponding to that shown in FIG. 1.

As will be appreciated, in the FIG. 3 construction both the axially movable piston valves 162, 163 and the axially movable flow control valve 125 are rotated by the common gear 142 and this rotation assists axial movement thereof in response to the axial pressures acting thereon. Moreover the piston valves 162, 163 and the flow control valve 125 are mounted in the space 120 in the common housing 117 and this space 120 communicates with the burner supply conduit 110 to receive fuel therefrom.

In order to balance the fuel pressures acting on the flow control valve 125, the left-hand end of the latter is mounted within a chamber 184 which, by way of a pipe 185, receives fuel from the portion 114 of the burner supply conduit 110. The chamber 184 will therefore be at the same pressure as the pressure in the space 121 into which the right-hand end of the flow control valve 125 extends.

We claim:

1. A gas turbine engine fuel control system comprising a first burner supply conduit and at least one second burner supply conduit, a fuel pump which communicates with both said conduits so as to be adapted to supply fuel thereto, first and second restrictors respectively provided in the first and second burner supply conduits, a flow control valve which is connected in the first burner supply conduit downstream of the first restrictor, the flow control valve controlling fuel flow therethrough in dependence upon the value of at least one engine variable, and valve means in the second burner supply conduit downstream of the second restrictor therein, the valve means being controlled in dependence upon the difference in the pressure in the first burner supply conduit downstream of the first restrictor and upstream of the flow control valve, and the pressure downstream of the second restrictor.

2. A fuel control system as claimed in claim 1 comprising manually controllable flow area varying means for varying the relative flow areas of the first and second restrictors.

3. A fuel control system as claimed in claim 2 in which the degree to which the flow area varying means vary the flow area of the second restrictor depends upon the value of at least one engine variable.

4. A fuel control system as claimed in claim 3 in which the degree to which the flow area varying means vary the flow area of the second restrictor depends upon the ratio of two engine pressures.

5. A fuel control system as claimed in claim 3 in which the second restrictor comprises a needle valve, the flow area varying means comprising a linkage for adjusting the needle valve.

6. A fuel control system as claimed in claim 5 in which the linkage comprises a manually movable lever movement of which adjusts the needle valve, the manually movable lever having a movable fulcrum whose position affects the extent to which manual adjustment of the manually movable lever adjusts the needle valve, the manually movable lever being connected to servo means responsive to the value of at least one engine variable so that the position of the said movable fulcrum depends, upon said value.

7. A fuel control system as claimed in claim 6 in which the first burner supply conduit communicates, on the downstream side of the flow control valve, with a bleed valve, means being provided for varying the flow through the bleed valve.

8. A fuel control system as claimed in claim 7 in which the last-mentioned means increase the flow through the bleed valve with increasing movement of the manually movable lever.

9. A fuel control system as claimed in claim 1 in which means are provided for positioning the flow control valve in functional dependence upon the ratio of a compressor pressure and a jet pipe pressure.

10. A fuel control system as claimed in claim 1 in which means are provided for controlling the fuel pump in dependence upon both engine rotational speed and the pressure drop across the flow control valve.

11. A fuel control system as claimed in claim 1 in which both the valve means and the flow control valve are axially movable, common means being provided for rotating both the valves means and the flow control valve to assist axial movement thereof.

12. A fuel control system as claimed in claim 1 in which the valve means and the flow control valve are mounted in a space in a common housing, which space communicates with the first burner supply conduit to receive fuel therefrom.

13. A fuel control system as claimed in claim 1 in which the first burner supply conduit is arranged to supply fuel to pilot burners of a reheat system in the jet pipe of the engine, a said second burner supply conduit being arranged to supply fuel to main burners thereof.

14. A fuel control system as claimed in claim 13 in which there is a further said second burner supply conduit which is arranged to supply fuel to burners disposed in a bypass air stream.

* * * * *